United States Patent [19]
Soman et al.

[11] Patent Number: 6,138,219
[45] Date of Patent: Oct. 24, 2000

[54] METHOD OF AND OPERATING ARCHITECTURAL ENHANCEMENT FOR MULTI-PORT INTERNALLY CACHED DYNAMIC RANDOM ACCESS MEMORY (AMPIC DRAM) SYSTEMS, ELIMINATING EXTERNAL CONTROL PATHS AND RANDOM MEMORY ADDRESSING, WHILE PROVIDING ZERO BUS CONTENTION FOR DRAM ACCESS

[75] Inventors: Satish S. Soman, Shrewsbury; Subhasis Pal, Winchester, both of Mass.

[73] Assignee: Nexabit Networks LLC, Marlboro, Mass.

[21] Appl. No.: 09/049,567

[22] Filed: Mar. 27, 1998

[51] Int. Cl.$^7$ ............................................. G06F 13/14
[52] U.S. Cl. ............................ 711/149; 711/119; 711/105
[58] Field of Search ................................. 711/104, 105, 711/118, 119, 147, 149

[56] References Cited

U.S. PATENT DOCUMENTS

| | | | |
|---|---|---|---|
| 5,442,747 | 8/1995 | Chan et al. | 345/509 |
| 5,457,654 | 10/1995 | McLaury | 365/189.01 |
| 5,490,112 | 2/1996 | Hush et al. | 365/189.04 |
| 5,550,961 | 8/1996 | Chimoto | 345/433 |
| 5,581,773 | 12/1996 | Glover | 712/14 |
| 5,623,698 | 4/1997 | Stephenson et al. | 710/38 |
| 5,799,209 | 8/1998 | Chatter | 710/56 |
| 5,835,941 | 11/1998 | Powlowski | 711/117 |
| 5,875,470 | 2/1999 | Dreibelbis et al. | 711/147 |
| 5,918,074 | 6/1999 | Wright et al. | 710/52 |

Primary Examiner—Eddie P. Chan
Assistant Examiner—Kevin L Ellis
Attorney, Agent, or Firm—Rines and Rines

[57] ABSTRACT

A technique and system for eliminating bus contention in multi-port internally cached dynamic random access memory (AMPIC DRAM) systems, while eliminating the need for external control paths and random memory addressing, through the use of data header destination bits and a novel dedication of reduced size slot buffers to separate DRAM banks and similarly dedicated I/O data read resource ports, particularly useful for relatively short ATM message networking and the like, wherein all system I/O resources are enabled simultaneously to write complete ATM messages into a single slot buffer, and also for SONET Cross Connect and WDM messages.

25 Claims, 9 Drawing Sheets

METHOD OF AND OPERATING ARCHITECTURAL ENHANCEMENT FOR MULTI-PORT INTERNALLY CACHED DYNAMIC RANDOM ACCESS MEMORY (AMPIC DRAM) SYSTEMS, ELIMINATING EXTERNAL CONTROL PATHS AND RANDOM MEMORY ADDRESSING, WHILE PROVIDING ZERO BUS CONTENTION FOR DRAM ACCESS

The present invention relates to dynamic random access memory technology (DRAM) of the type described in U.S. patent application, Ser. No. 581,467, now U.S. Pat. No. 5,799,309, filed Dec. 29, 1995 for High Performance Universal Multi-Port Internally Cached Dynamic Random Access Memory (AMPIC DRAM) System, Architecture And Method, by Mukesh Chatter, and of common assignee herewith, that eliminates current system bandwith limitations and related problems and provides significantly enhanced system performance and at reduced cost, enabling substantially universal usage for many applications as a result of providing unified memory architecture. The invention is more particularly directed to improvements in such systems particularly adapted for ATM (asynchronous-transfer mode) Sonet (Synchronous optical network) cross connect and WDM (wave design multiplexing) and similar applications.

BACKGROUND OF INVENTION

In multi-ported internally cached dynamically random accessed memory systems (AMPIC/DRAM) of the type described in said copending application and hereinafter more fully explained, independent serial interfaces buffer cache data written into the AMPIC device before writing it into shared internal DRAM banks, over which contention arises. The buffer slot caching of the data received on the serial interfaces reduces the chances that internal contention to a particular DRAM bank will affect the overall external performance of the serial interfaces by increasing the number of requests that may be outstanding to a particular internal AMPIC DRAM bank before it becomes necessary to stop the writing of information on one of the external serial interfaces in order to avoid overrunning the limited write cache buffer slot space for that particular serial interface. Because of the potential for a large number of read and write access requests to be contending for switching to a particular DRAM bank, the time it takes the AMPIC device to write data into one of the internal DRAM banks can significantly vary up to some finite maximum amount of time.

More generally, the technique of said co-pending application as used in a system having a master controller such as a central processing unit (CPU) having parallel data ports and a dynamic random access memory (DRAM) each connected to and competing for access to a common system bus interface, resides in an improved DRAM architecture comprising the multi-port internally cached DRAM (AMPIC DRAM) wherein a plurality of independent serial data interfaces is provided, each connected between a separate external I/O resource and internal DRAM memory through corresponding buffers. Switching is effected between the serial interfaces and the buffers, under a dynamic logic control by the bus master controller, such as said CPU, for switching allocation as appropriate for the desired data routability amongst the I/O resources addressed destinations. Arbitration is performed for bus interface access amongst the various active packet buffers and the CPU, but with no arbitration required to receive or transmit data from or to the packet buffers via the serial interfaces. The AMPIC DRAM switching module, furthermore, assigns any buffer to any serial interface and without any intermediate step of transferring data between the buffer and the core DRAM, and with each buffer having the capability to interface with up to all the serial interfaces simultaneously when defined as a port, each buffer, moreover, being configured for the same port size as the port to which it is connected or docked.

This technique is useful for handling with relatively large and short data messages and with reduced bus contention While reducing arbitration requirements of bus access contention for relatively large messages through efficient utilization of the data port cache slots and DRAM bank access randomization as much as possible, in accommodating for relatively short or small messages, the AMPIC DRAM array system may, however, under-utilize the available space in a buffer cache slot, resulting in a rapid depletion of available buffer slots.

It is accordingly to the improvement of such small message slot space under-utilization that the present invention is primarily, though not exclusively concerned—such being of particular concern with ATM and similar type system operations. The present invention accomplishes this through eliminating the need for external control and addresses storage, using rather, inherent data header destination information, and, in so doing, reducing to zero all bus contention for DRAM access, as well, as will be more fully explained.

OBJECTS OF INVENTION

A primary object of the present invention, accordingly, particularly (though not exclusively) when applied to ATM and similar or related system operations, is to provide a new and improved method of and system for AMPIC DRAM operations that eliminates the necessity for external controls and addressing storage, and simultaneously reduces all bus contention for DRAM access to zero.

A further object is to provide a novel system wherein more efficient utilization is effected of the data cache buffer slot space associated with serial interfacing with the DRAM arrays; particularly, more fully utilizing such space for relatively short or small messages.

An additional object of the present invention, moreover, in eliminating the external control path and addresses, is to provide a system which uses an inherent header destination information or "destination tag", which allows a message to be self-routing through the AMPIC device. The invention allows all messages with the identical tag to be routed to the same DRAM bank, regardless of from which I/O resource the message originated. This "sorting capability" or aggregation of traffic with the same destination, is extremely well suited to the before-mentioned SONET Cross Connect and WDM (Wave Division Multiplexing) systems.

Still a further object is to provide a system that eliminates small message slot space underutilization by packing messages together before writing a DRAM bank, this being especially useful for ATM and similar type system operations where messages are inherently small.

It is the object of the present invention, furthermore, to provide the above features while, in all cases, reducing bus contention for DRAM access to zero.

Other and further objects will be explained hereinafter and are more fully delineated in the appended claims.

SUMMARY

In summary, from one of its important viewpoints, the invention embraces for use in a system having a master controller such as a control processing unit having parallel data ports and a random access memory (DRAM) each connected to a common systems bus interface, an improved DRAM architecture comprising an array of multi-port internally cached DRAM banks (AMPIC DRAM) each comprising a plurality of independent serial data interfaces connected between a separate external I/O data write resource port and the corresponding internal DRAM memory through a corresponding data caching multi-cell slot buffer; each DRAM bank being connected to a single slot buffer and to a single destination I/O data read resource port each dedicated to that DRAM bank for respectively storing buffered data destined for that bank and for reading out the stored data solely to the dedicated I/O data read resource port; a cross-bar switch interposed between each I/O data write port and the corresponding slot buffer, but with all I/O data write ports connected to input data to each cross-bar switch, allowing the I/O data write port to write any cell within the slot buffer.

Preferred and best mode design and operational details will hereinafter be presented.

DRAWINGS

The invention will now be explained with reference to the accompanying drawings in which.

Figure 1:
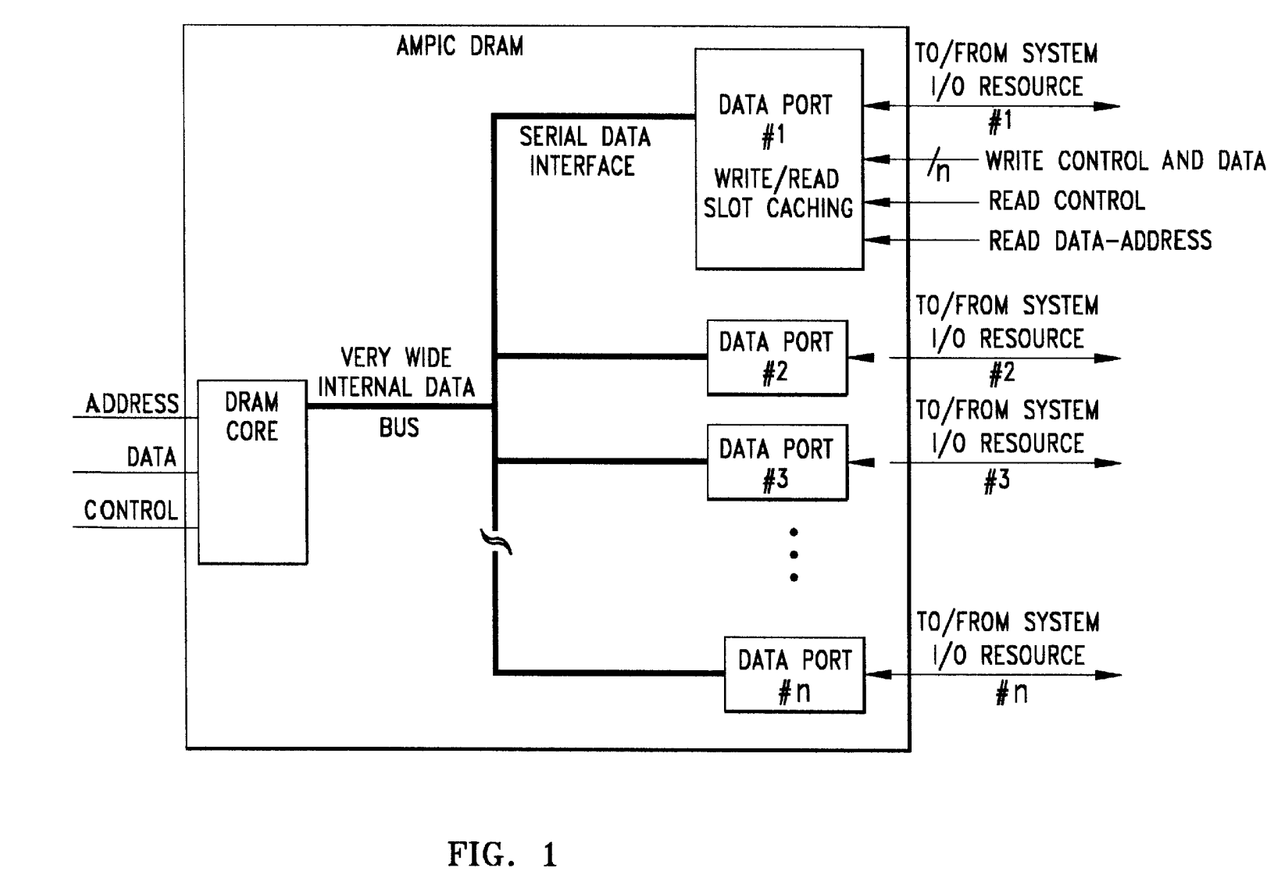
FIGS. 1 and 2 are illustrative block diagrams of the internal architecture of the AMPIC DRAM system of said co-pending application.
Figure 2:
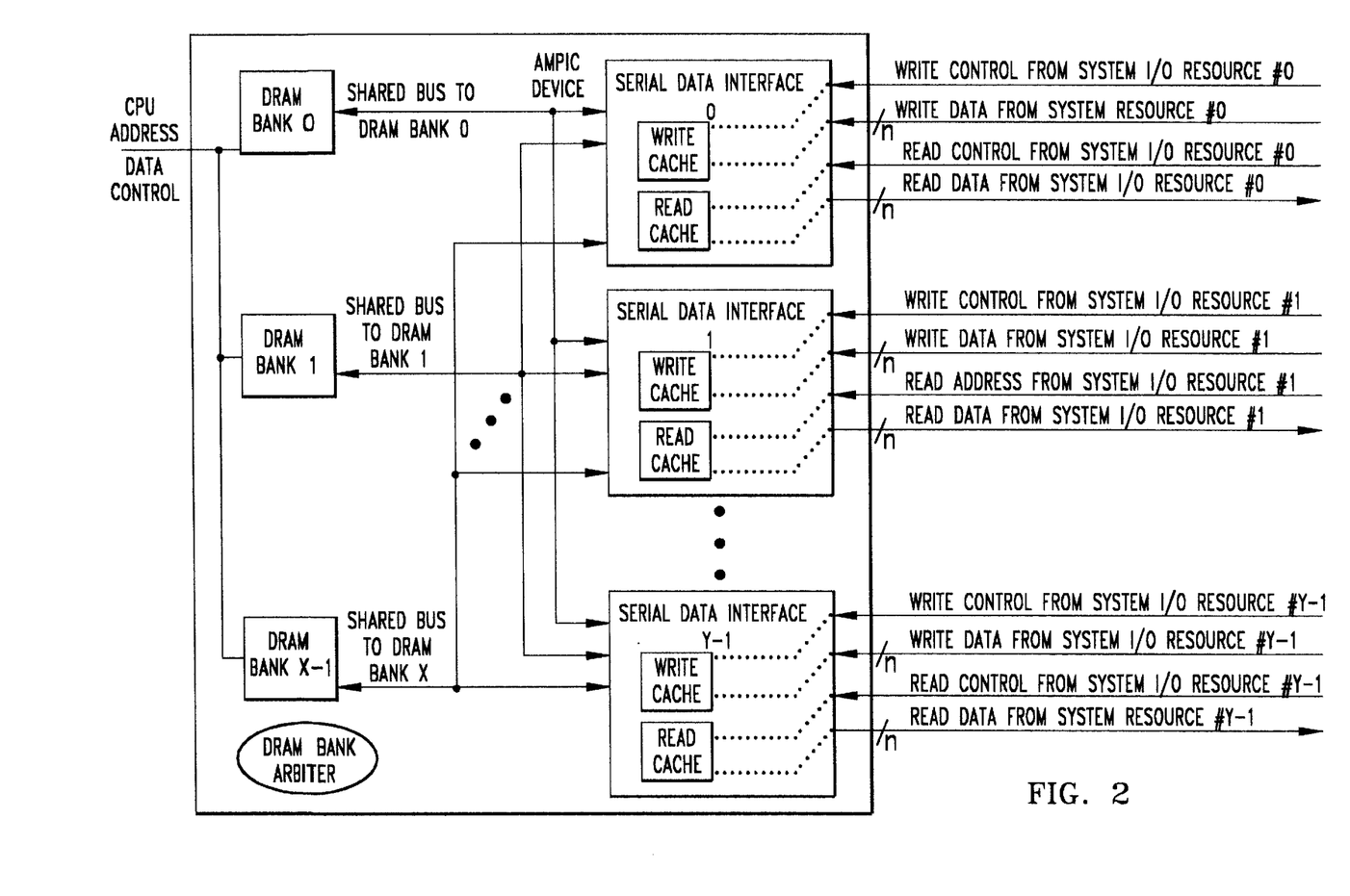

Before turning to preferred implementations of the present invention, it is believed useful, in order better to contrast the invention from the basic system of the said co-pending application, to review the latter in summary fashion with reference, first, to FIGS. 1 and 2.

The AMPIC DRAM Approach of the Copending Chatter Application

As earlier described, the basic structure provided by the AMPIC DRAM device of said co-pending application provides a very high bandwidth connection between system I/O resources applied at data ports comprising serial interfaces each provided with buffer caching slots, to DRAM memory array banks located within the AMPIC DRAM device. The architecture encompasses the different AMPIC memory devices that can be created by varying the number of DRAM banks, varying the number of serial interfaces, and varying the number of data ports per serial interface. A system I/O resource refers to a block of logic that requires the ability to read and write data into an AMPIC device or a group of AMPIC devices. The AMPIC device provides a mechanism for switching transfer of large amounts of data from one system I/O resource to another, amongst I/O resources 1 . . . n in FIG. 1, granted that a source system I/O resource can inform a destination system I/O resource that it has placed data at a specific address inside of the AMPIC device for the destination system I/O resource. The AMPIC device contains internal DRAM banks each of which has a number of memory locations in it, wherein variable sized data blocks can be read and written. The maximum allowable data size is fixed by the particular implementation of the AMPIC device. Each of the AMPIC memory addresses identifies a particular memory location in a particular internal DRAM bank, to which data can be written and read through all of the serial data interfaces, with all system I/O resources being adapted to read and write all of the AMPIC memory locations through the serial interface to which they are connected.

Each system I/O resource has a write control bus and a write data bus connected to one of the AMPIC device serial interfaces, so labeled in FIG. 1 and more fully shown in FIG. 2, to write data into the AMPIC device. To write a variable sized block of data into the AMPIC device, a system I/O resource sends an AMPIC address on its write control bus and the variable sized block of data on its write data bus. As the serial data interface on the AMPIC receives the address and data, it places it into the write cache buffer slots of that serial data interface. After completing the current write operation into the serial data interface to which a particular system I/O resource is connected, it can immediately start writing another variable sized data burst to another AMPIC device address. As more data is written into the AMPIC on one serial data interface, the write cache slots may fill up faster than they can be emptied. To keep the write cache on each serial interface from overflowing, each serial interface has the means to stall (or temporarily stop) the current data wire transfer until enough space has been freed up in the write cache to finish completing the current write transfer. The serial data interface signals the system I/O resource to stop sending data through the system I/O resource control bus. As data is written into the write cache of each serial data interface, the serial data interfaces request access to the internal DRAM banks in the AMPIC device. The DRAM bank arbiter, FIG. 2, grants the different serial data interfaces access to the DRAM banks of the AMPIC device, allowing the serial data interfaces to be switched to move the data from the write cache into the proper memory location in the internal DRAM banks. The write caching is used in the serial data interfaces to help smooth over periods of contention when multiple serial data interfaces are attempting to write data into the same DRAM bank. When too many requests are outstanding to the same DRAM bank from the different serial interfaces, however, some of the serial interfaces are forced to stall the current write operations in order to prevent their write caches from being overflowed.

In addition to the write control and write data buses, as previously stated, each system I/O resources has a read control bus and a read data bus, FIGS. 1 and 2, connected to one of the AMPIC device serial interfaces to read data from the AMPIC device. When a system I/O resource wants to read the variable sized data block located at a particular AMPIC address, it writes the address into the AMPIC serial data interface to which it connects on its read control bus. The serial data interface on the AMPIC places the address in the read cache until it can gain control of the internal DRAM bank in which the data is stored and read it out. After retrieving the data, the serial data interface transmits the variable sized data block back to the system I/O resource. Because of the uncertainty of the delay in reading data from an AMPIC address, the AMPIC device is designed such that data from several addresses can be requested and stored in the read cache before the first variable sized data block is fetched and returned. This allows multiple blocks of data to be requested and retrieved out of the DRAM banks at the same time. The AMPIC, however, preserves the order that the addresses were inserted and can transmit the data retrieved back to the system I/O resource in that order.

Figure 3:
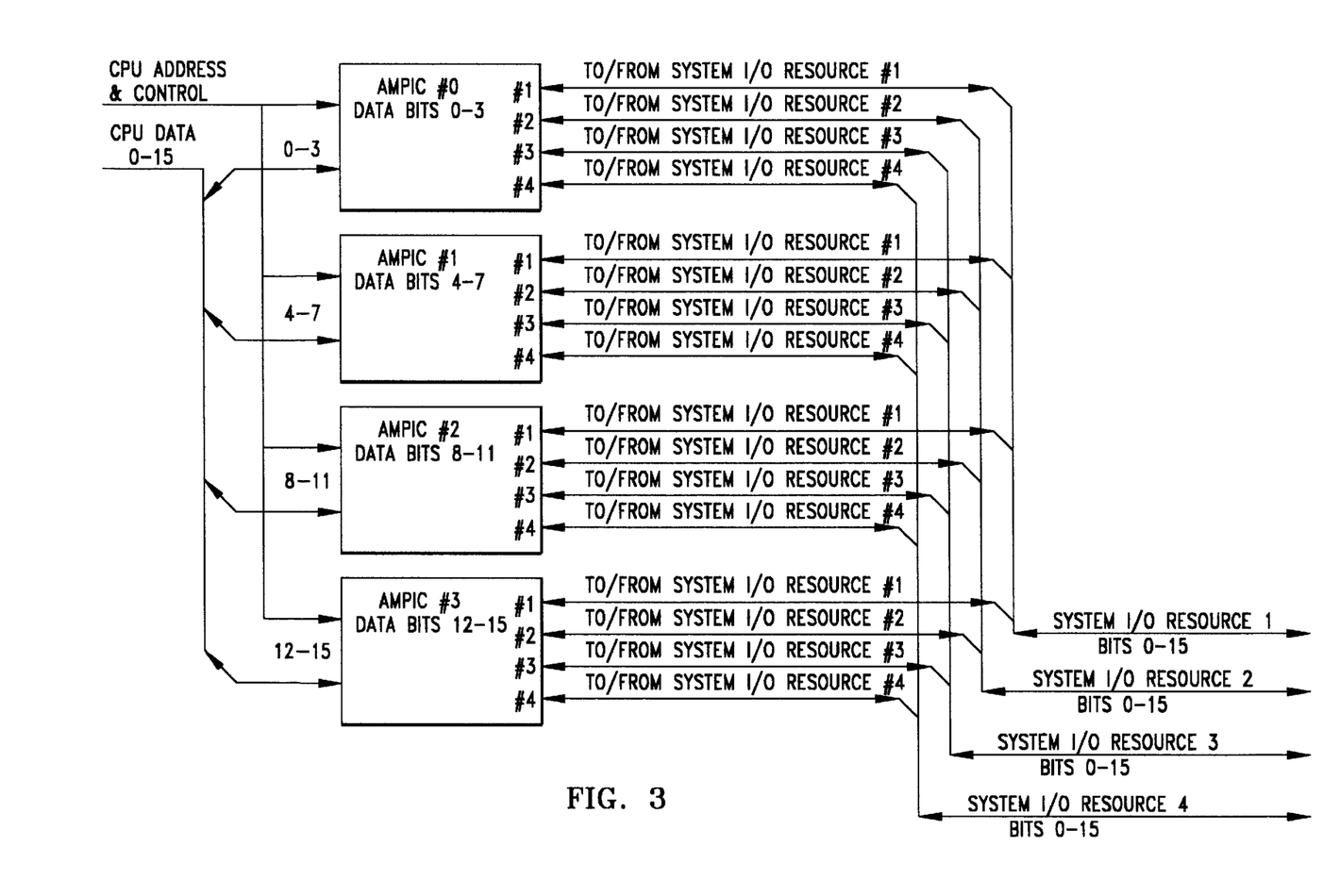
FIG. 3 is a block diagram of an exemplary system architecture based on the AMPIC DRAM, system of FIG. 1.
Figure 4:
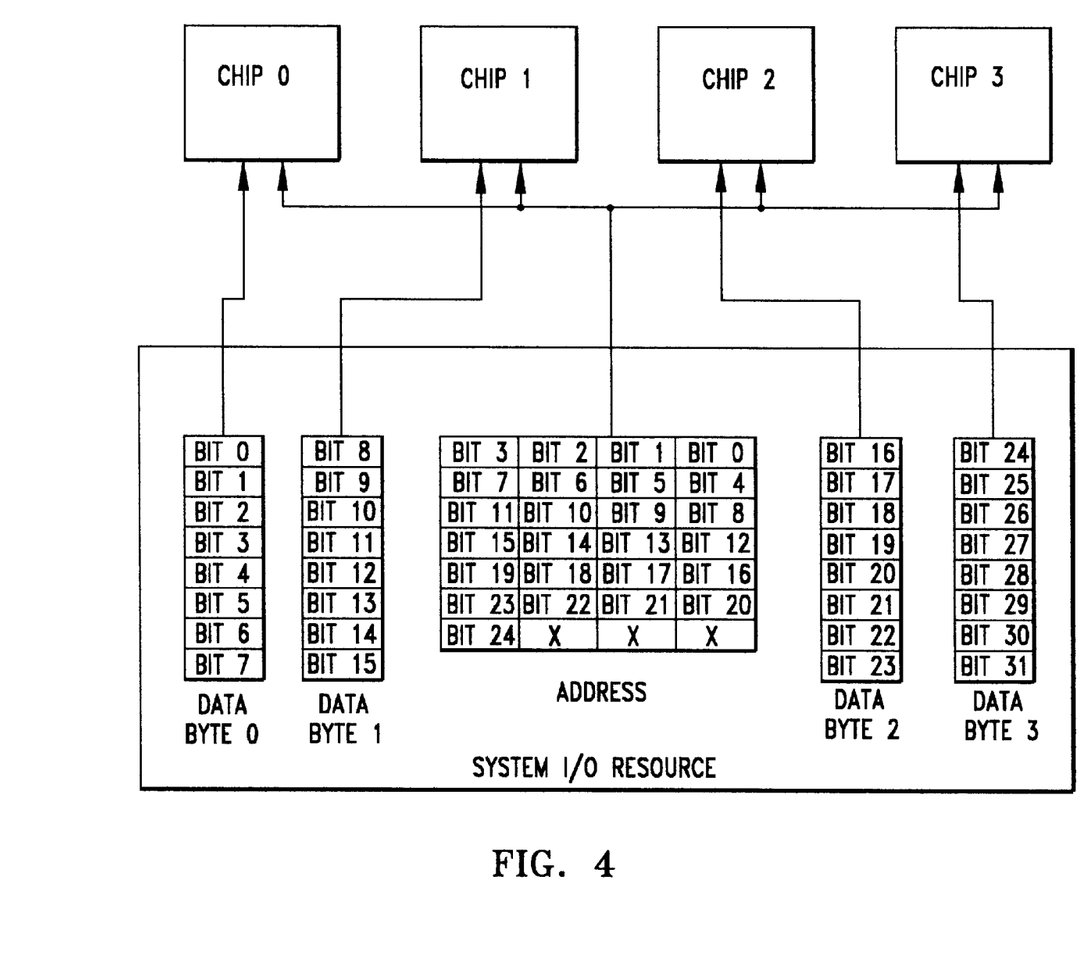
FIG. 4 illustrates the methodology by which address and data are distributed to such AMPIC DRAM devices by the system I/O resources.
Figure 5:
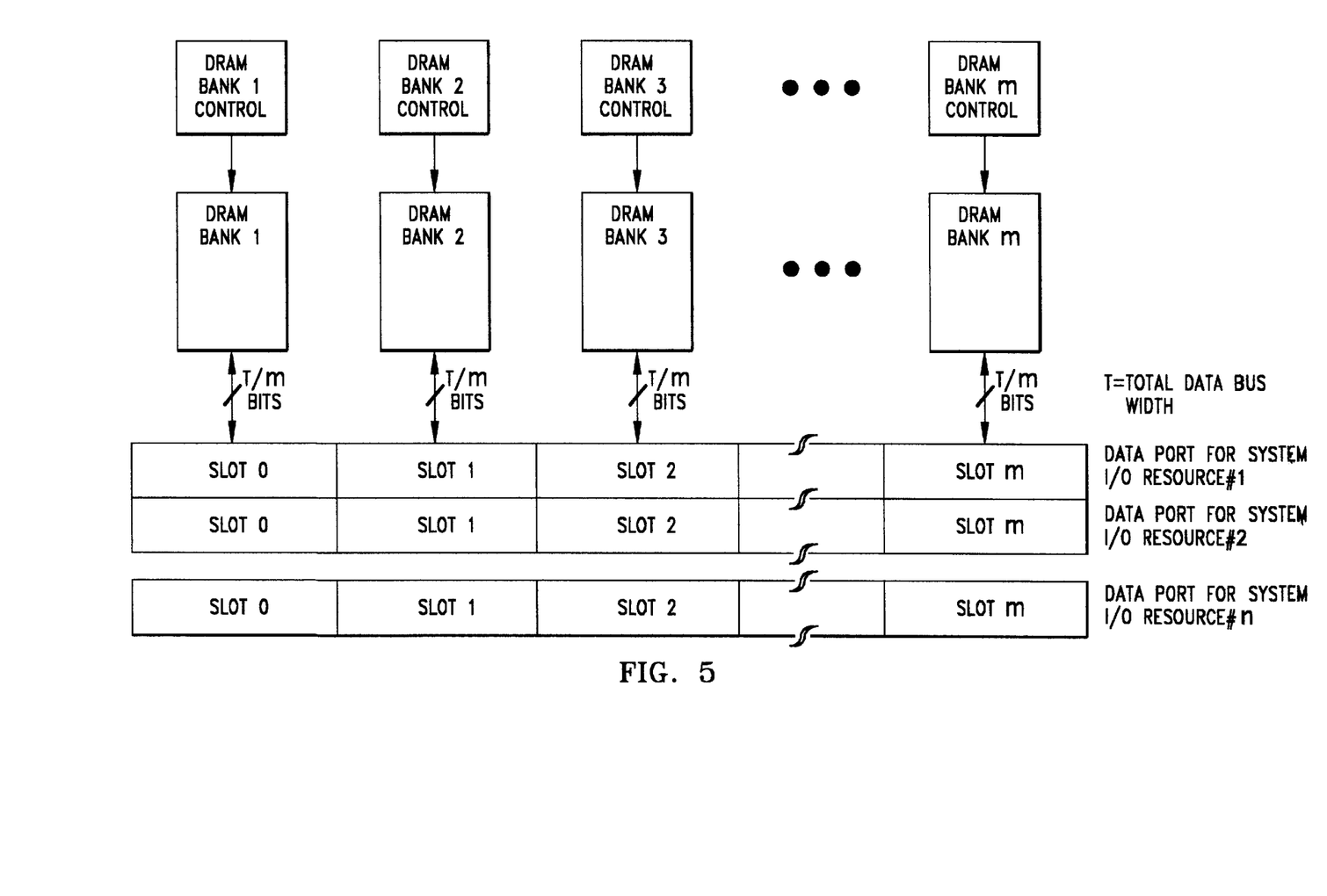
FIG. 5 is a block diagram of the architecture of such AMPIC DRAM internal bus, illustrating the partitioning to allow both several simultaneous small data transfers, or single very wide data transfers.

The flexibility of the AMPIC device is further enhanced, moreover, by its ability to 'stack' multiple AMPIC devices into an array of AMPIC devices to create a much larger virtual AMPIC device, as shown in FIGS. 3 to 5. In FIG. 3, AMPIC units #0—3 are exemplarily shown for the case of the CPU data bits 0–15, with interfacing of each AMPIC device of the bank or array with each of system I/O resources #1–#4 for bits 0–15. The methodology by which address and data are distributed to such AMPIC DRAM devices (termed "CHIPS" in FIG. 4 since such is the form they are intended commercially to assume), in accordance with the technique of said co-pending application by the system I/O resources, is outlined in FIG. 4. The address bits (center of the illustrative system I/O resource) are fed to all AMPIC chip devices #0–3, with the bits of data byte 0 (bits 0–7) applied to chip 0; databyte 1 (bits 8–15) to chip 1; databyte 2 (bits 16–23), to chip 2, and databyte 3 (bits 24–31) to chip 3, etc., and with the linking together of a unit of data across several such DRAM sections. In FIG. 4, address pins are shown as separate pins from the databus. Specific implementations can optimally multiplex address and data pins to enhance data transfer rate to AMPIC.

FIG. 5 details the architecture of an exemplary AMPIC DRAM internal bus system, illustrating the partitioning that allows both several simultaneous small data message transfers or single wide data message transfers. In this illustration, 1 to M DRAM banks are shown, each externally controlled, and each provided with cross-bar switching inputs (T/M bits where T is the total data bus width) for applying along the common shared bus, the data cached in #1–n data port serial interface buffer caching slots 0–M, from respective system I/O resources #1 . . . N.

This makes it possible to scale the data buses from the array of AMPIC devices or virtual AMPIC device, increasing the data rate at which data can be written into and read out of a single AMPIC device by "n" times, and also increases the maximum amount of data that can be stored at each memory location to "n" times its size in a single AMPIC device.

When multiple AMPIC devices are collected into an array of AMPIC devices and used as one large virtual AMPIC device, as shown in above-described FIGS. 3, 4, 5, and 6, all 'm' AMPIC devices are clock-cycle synchronized, meaning that even though no control wires connect the AMPIC devices together, the 'm' AMPIC devices will stay perfectly synchronized because the exact same read and write accesses are performed on all 'm' devices at the same time. It should also be observed that because a single AMPIC device as there are for a virtual AMPIC device. A number of AMPIC devices synchronized together is therefore herein referred to either as array of AMPIC devices or as a virtual AMPIC device; and discussion about a single AMPIC device also directly applies to a virtual AMPIC device and vice versa, because a virtual AMPIC device is simply multiple AMPIC devices working in parallel.

Since the interfaces share the same internal DRAM buses to the DRAM banks, as shown in FIGS. 1–3, to put data into the DRAM banks and take it out, it is inevitable that contention will occur for these shared resources some statistical percent of the time, thus causing the time it takes to read or write data into and out of the internal DRAM banks inside the AMPIC memory to have a significant variance with some guaranteed upper bound. In an effort to alleviate the majority of this contention, extra buffering or caching is provided such that a few write accesses can be stored, as described above, before reaching the point of having to stall one of the external serial interfaces to one of the system I/O resources. By buffering a few write operations in the serial interface, the majority of times contention occurs, it is alleviated before having to stall any of the external serial data interfaces. Similarly, some level of caching is provided for the read accesses such that multiple read requests can be stored and handled simultaneously to the DRAM banks, reducing the chance that no data will be present to send a particular system I/O resource.

Figure 6:
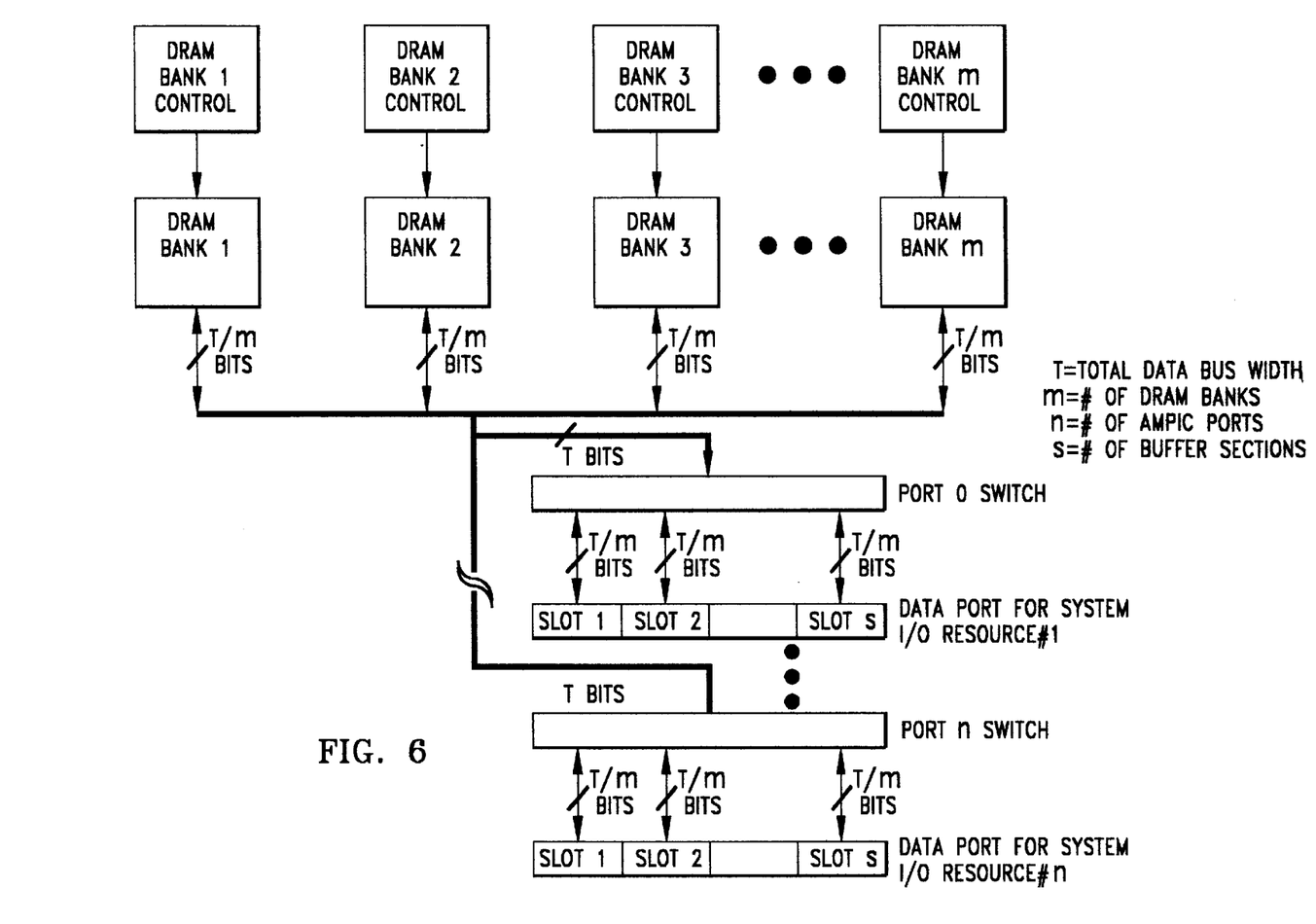
FIG. 6 is a block diagram of the AMPIC DRAM internal system bus, with a crossbar switch located between each AMPIC DRAM port buffer and the DRAM array.

In summary, as more fully shown in FIG. 6, that details the internal system bus with a crossbar switch located between each AMPIC DRAM port buffer and the DRAM array, each system I/O resource is thus connected to a data port within the AMPIC DRAM device, with each data port divided into a number of buffer slots equal to the number of DRAM banks. The mXn crossbar "switch" is shown placed between each system I/O resource data port and the DRAM array, where the DRAM array consists of m banks and the data port consists of n slots. The crossbar switch enables any slot to be driven into any one of the DRAM banks via the very wide data bus (shown in heavy lines). The crossbar switch allows a system I/O resource to utilize empty slots if contention for a DRAM bank occurs during the current write cycle. When permission is so granted, the AMPIC will enable the slot onto the correct DRAM bank lane on the wide data bus. The earlier described contention for a DRAM bank can occur for a number of reasons, a read cycle is ongoing; multiple messages from the same system I/O resource are destined for the same DRAM bank, messages from other system I/O resources are destined for the same DRAM bank. Since a system I/O resource data port contains a limited number of slots to buffer messages until access is granted, when a data port has no available slots, back pressure is applied to that system I/O resource and system performance drops.

In a typical AMPIC DRAM array system of the copending application, contention is, however, minimized by the fact that large messages utilize slots efficiently and DRAM bank access is randomized as much as possible. Small messages, on the other hand, as earlier mentioned, underutilize the space in a slot, resulting in a rapid depletion of available slots.

Consider, for example, the case of an AMPIC DRAM array system, as in FIG. 6, comprised of 16 I/O resources with 16 stacked AMPIC DRAM devices. Each AMPIC DRAM contains 16 banks of 512 bit wide DRAM. This architecture results in an internal wide data bus of 8 kbits per device, or 128 kbits across all stacked AMPIC devices. On a single AMPIC device, each system I/O resource data port contains 16 slots with 512 bits of storage per slot. A single slot can store 8 kbits across all 16 stacked AMPIC devices.

Considering a system I/O resource writing a relatively short 424 bit ATM message to a slot across the entire AMPIC DRAM array, such message occupies only 5% of the slot; and with a 4 bit wide data path to each AMPIC, the transaction takes only 7 clock ticks to complete. This poor utilization of slot space, in conjunction with DRAM bank contention, can result in a rapid depletion of available slots and ultimately degradation in system performance.

It is now in order to describe the modifications to the system of said copending application effected by the present invention that, for certain applications, such as ATM, totally eliminates any contention whatsoever, and obviates the need for extra buffering and other of the above concerns, while additionally removing all requirement for external addressing control, and further enabling more efficient use of caching slots in the serial interface buffers for short data messages.

THE INVENTION

These ends and the attaining of a very high system bandwidth to memory applications utilizing small messages, are accomplished by the present invention through a novel architecture that, as before stated, entirely eliminates DRAM bank contention within an AMPIC DRAM device. This is particularly useful, as previously noted, for pure ATM networking systems, (and the like), where the incoming messages are only 424 bits in size.

Figure 7:
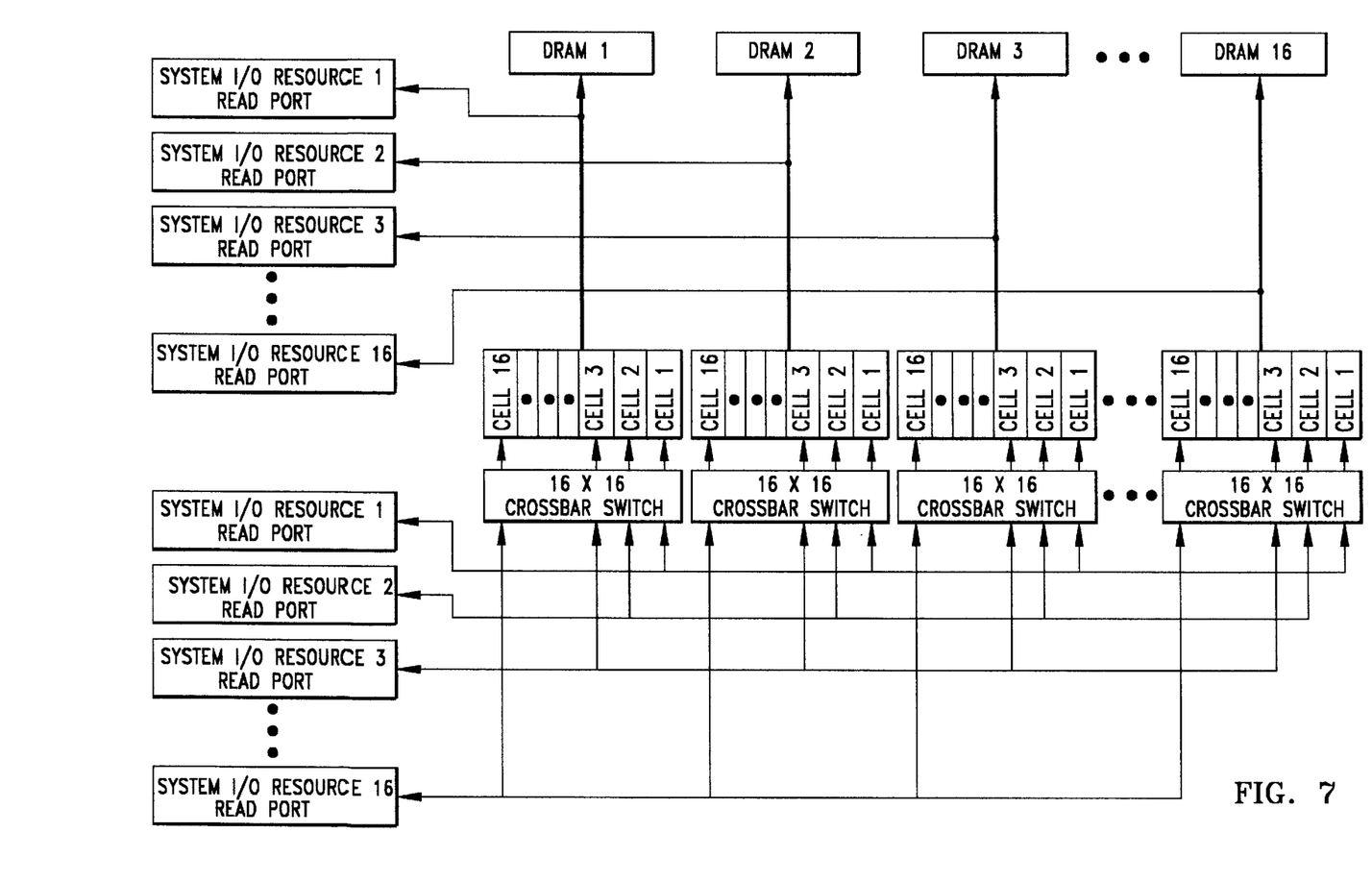
FIG. 7 illustrates a preferred embodiment of the present invention with DRAM banks dedicated to system I/O resources, dedicated DRAM bank slots partitioned into cells, and crossbar switches located between all the system I/O resources and each slot.

A preferred embodiment of the invention for alleviating these problems is illustrated in FIG. 7, using as an illustration the above example of 16 I/O resources. In accordance with the invention, each DRAM bank has a single dedicated slot buffer for storing messages destined for that bank. Each slot buffer is partitioned into a predetermined number of cells, where that number represents also the number of system I/O resources.

A single cell can accommodate a complete ATM message and some additional control information, the cell being defined as 32 bits per device, or 512 bits across all 16 devices in the "AMPIC DRAM" array.

In the earlier presented example of 16 system I/O resources, a single slot has 8 kbits of total storage (512 bits×16) across the AMPIC DRAM array and therefore can hold 16 ATM messages. Each system I/O resource, however, has a unique datapath to all 16 slots. An mXn crossbar switch, so-labeled, is placed between each slot and all of the system I/O resources, where m represents the number of system I/O resources and n represents the number of cells per slot. This enables the AMPIC device to steer an incoming message to any cell within a single slot. It should be noted that this implies that a cell is not dedicated to a system I/O resources, but is rather just an available storage space.

An important feature of this novel architecture is the ability for all 16 system I/O resources simultaneously to write complete ATM (or similar) messages into a single slot, or any number of slots. This architecture thus fully utilizes the high bandwidth on the internal wide memory bus by packing small messages together.

At first glance it might appear that DRAM bank contention has been eliminated since messages destined for the same bank have been packed together in the same slot. There is, however, a remaining problem in that each of the 16 ATM messages stored in a single slot will probably have a different row address, even though it is destined for the same bank. This will almost always occur if each message and associated DRAM address comes from a different system I/O resource. It is therefore now in order to describe the preferred mechanism of the invention by which DRAM contention is indeed completely eliminated.

For purposes of analogy in explanation, consider each system I/O resource with its dedicated DRAM bank as a mailbox. A mailbox only contains messages for the system I/O resource that exclusively owns it. The partitioning of the memory as in FIG. 7, thus eliminates contention during read cycles. This architecture requires that the number of DRAM banks be equal to or greater than the number of system I/O resources. Incoming ATM messages no longer require a DRAM address, but just a unique mailbox number. A system I/O resource injects such a mailbox address (destination messages no longer require a DRAM address, but just a unique mailbox number. A system I/O resource injects such a mailbox address (destination port number) along with the message and the messages are routed to the appropriate slot based on the mailbox address.

Figure 8:
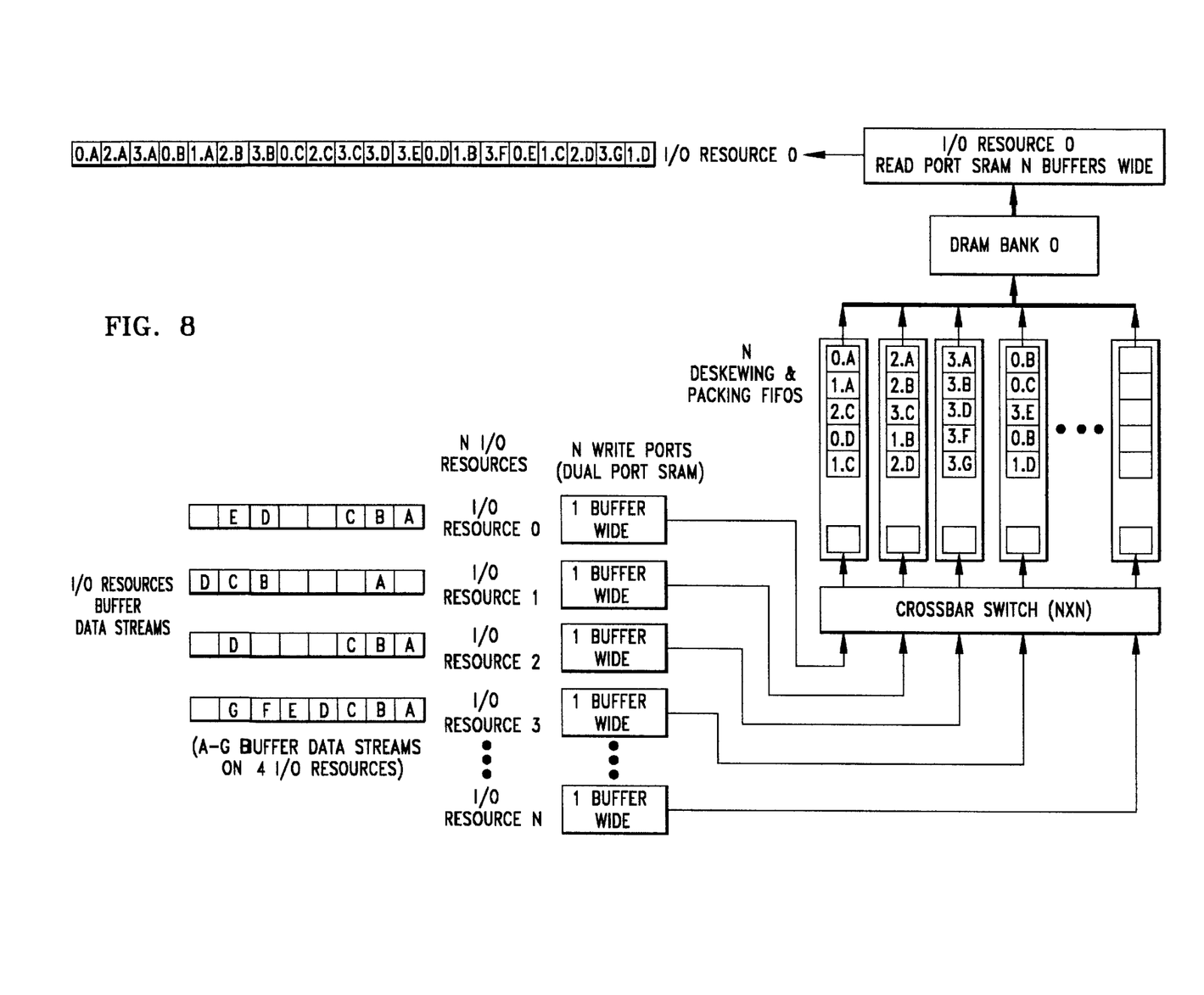
FIG. 8 illustrates in detail the implementation of a buffer slot and the corresponding cells, with examples of multiple data streams on different I/O data write ports with a common destination, aggregating into a single AMPIC DRAM bank and resulting in a single data stream to a single I/O read port.

Messages are then packed back-to-back in cells via the mXn crossbar switch before described. FIG. 8 illustrates the implementation details of the before-described architecture. In order to pack the messages back-to-back and fully utilize a slot, each cell has to accept multiple entries. For example, a situation could arise where only some of the cells are holding messages resulting in a partially filled slot. The DRAM would not write the data because the slot has empty cells and this would under utilize the DRAM memory. Under the worse case situation, the I/O write ports might have 16 new messages available for writing, with all the messages destined for the same DRAM bank, and thus the same slot. In fact, since each I/O write port messages independently, a mismatch between available cells and messages is actually typical. This problem is easily corrected by implementing each cell as a small fifo with a minimum depth requirement of 2. This novel implementation guarantees that the slot can always accept 16 messages. If the $1^{st}$ row of fifo entries in a slot are partially filled, the crossbar switch directs the new messages to sequentially fill the empty cells, completing the $1^{st}$ row. If the number of incoming messages are greater than the number of entries in the $1^{st}$ row, then the remaining messages are directed to the $2^{nd}$ row of fifo entries. Since there is no contention for write cycles to the DRAM the $1^{st}$ complete row is accepted by the DRAM, emptying the top of the fifo. FIG. 8 illustrates this architecture with example data streams. Note that in some cases a partially filled slot can be written to the DRAM bank if no incoming messages are available and the DRAM write logic senses a minimum system latency time has been violated. In other embodiments of the invention the cell fifo architecture can have deeper depths depending on the contention. For example, in an alternate implementation, multiple slots could compete for the same bank, but the cell fifo's would have to be greater than 2 deep to absorb messages while waiting for access to the DRAM bank.

In a typical case, not all 16 I/O resources will be sending messages to a mailbox, implying that some cells will be empty. The AMPIC needs knowledge of this during read cycles and can keep track of this by writing an invalid bit in the unused cells. When a system I/O resource responds to a AMPIC mailbox flag signal (message available), messages are read out of a DRAM in the exact order in which they were written. This lends itself synergistically to ATM traffic protocol, which states messages from a single system I/O resource must maintain order. The AMPIC maintains order by using simple read and write address counters to keep track of the data in the DRAM mailbox. This lends synergistically to the ATM, Sonet Cross Connect and WDM traffic protocol, which state messages from a single system I/O resource must maintain order.

Consider, for example, the extreme case of a multicast message being sent by all 16 system I/O resources to all other 16 system I/O resources. The unique architecture of the invention can accommodate all 256 messages in 256 cells across 16 slots. There is thus no contention whatsoever during the write cycle. And, as earlier pointed out, since each system I/O resource has a dedicated mailbox and does not have to contend with the other 16 system I/O resources for DRAM access, there is no contention on the read cycle, as well.

In addition to providing for zero contention, the invention also eliminates the necessity for the external control paths and addressing of said copending application.

Instead of having buffers feeding into the AMPIC device with random addresses and being written into memory randomly, in accordance with the invention, as the data packet is received and broken up into buffers, at that point in time, the system already knows the destination by simply looking at the initial headers in the packet. Thus, initially the I/O resource module knows the destination (address) that the packet or the buffer is to go to, so that when the buffer is injected into the AMPIC DRAM system, instead of having a random memory address, it inherently has the address of the destination I/O module.

In the illustrative case of FIG. 6, in a system with 16 IO modules, one IO module will basically have a 4-bit address from the header, saving that this particular buffer is going to a particular destination. Since, moreover, in accordance with this architecturally enhanced AMPIC system of the invention, each DRAM bank is devoted to an I/O module, everything written into a bank is destined for only one I/O module. In this particular case, therefore, it can be said that DRAM bank 1 of FIG. 6 only contains buffers for I/O module 1. DRAM bank 2 contains buffers only for I/O module 2, and so on. This feature has several advantages. First of all, as above shown, when an I/O module comes into an AMPIC system to read buffers, there is no contention for a particular DRAM bank because an I/O module only read from one DRAM bank, and does not contend with other DRAM banks. While all I/O resources need to write to all banks, as shown at the bottom of FIG. 7, each I/O resource only reads from one dedicated DRAM bank, shown in FIG. 7 at the top, as reading selectively.

The invention, therefore, for its applications, eliminates the external control and memory addressing of said co-pending application in favor of using the incoming packet header 4-bit destination address, basically saying that the particular buffer is destined for a particular I/O resource and should go to such particular resource at the DRAM bank that is dedicated to that I/O module. If, for example, I/O resource 1 has buffer data going to I/O module 2, it will write into DRAM bank 2. On the incoming side of a DRAM bank, however, there is the need to be able potentially to take buffer data from all ports, because all ports may be sending buffers to the same destination. To adjust for that problem, the invention uses buffers of reduced sizes so that a DRAM row can be partitioned into smaller buffer sizes, i.e. cells. This architecture allows messages to be self-routing through the AMPIC device. This "sorting capability" or aggregation of traffic with the same destination, is extremely well suited to Sonet Cross Connect and WDM (Wave Division multiplexing) systems.

Whereas, in accordance with the technique of the said co-pending application, a buffer size of 512 bytes or 256 bytes is employed, the present invention reduces the buffer size, say to 64 bytes, creating 16 cells of 64 bytes each across the 16 DRAM array. As an I/O resource feeds data in, it would write into one of these cells. Even if all 16 resources were trying to write to the same DRAM, there are now enough cells to accommodate all such 16 I/O resources.

The invention thus provides the feature of the smaller buffer size that enables one DRAM bank to take buffer data from everybody at the same time, as opposed to the current architecture of the said co-pending application that has a buffer size equal to the entire amount that can be written to a DRAM at once. Instead of having a 512 buffer size, the 64 bytes of the invention enable everybody to access the DRAM, as above explained.

It should be emphasized, moreover, that with the present invention, the cross-bar switch is disposed between the I/O resource and the buffer cells (sometimes referred to as SRAM) so that if all the resources are not writing to the destination DRAM, then the buffers can be packed so as not to waste memory space. As an example, assume I/O resources 1 and 16 are writing to I/O module 2. They would both write into I/O DRAM 2. Instead of writing into slots 1 and 16, however, the cross bar switch would allow the two buffer data to be put next to each other in adjacent cells 1 and 2, avoiding creating holes or unused spaces in memory.

The before described 64 bytes selection is perfect for ATM applications and the like because a 53 byte set fits right into 64 byte space. But if, for some reason, it is desired to have a bigger buffer size, that can easily be done by widening the bus with a different flavor of AMPIC, or by using the current flavor, but just laying down columns of them. In fact, buffer size can be increased by not only columns, but by putting down, say, 32 AMPIC devices, in which event, the 64 bytes will now become 128 bytes.

In contrast to the technique of said co-pending application, in summary, the present invention puts the 16 by 16 cross bar switch in front of the SRAM or cell buffer, now directly underneath every DRAM. When buffer data enters, it is routed to a particular SRAM and DRAM based on the predetermined destination tag of the header, and there would not be a memory address. Thus, buffer data comes in and is routed to a DRAM bank based on the destination that was predetermined at the I/O module, so that outside of the AMPIC, a flag would turn up almost like a mailbox flag, and an I/O resource would come in and read just its bank and get all buffers data that was destined just for the particular I/O module, and no longer needing to send an address around the system on a control pack to a destination module and no longer requiring that such a module pull out buffers at random memory locations. Each I/O module is going to come in and it is going to know just to read out the selected mailbox and DRAM, with all the buffers in that one DRAM bank destined for that one I/O module. So, it is now just a function of knowing there is something in the mailbox, and going to read it.

With the distinctive design map of the invention, when writing to the DRAM there are no addresses, just counters, with everything being written as it is coming in, in a kind of fifo architecture, as before discussed. Each DRAM bank that has been analogized to a mailbox, has a write pointer and a read pointer, with the write pointer starting at 0; and as the buffer data come in, just writing them in order. Order is maintained based, therefore, on the order the buffer data came in, confirming to networking architecture that order has been maintained.

Figure 9:
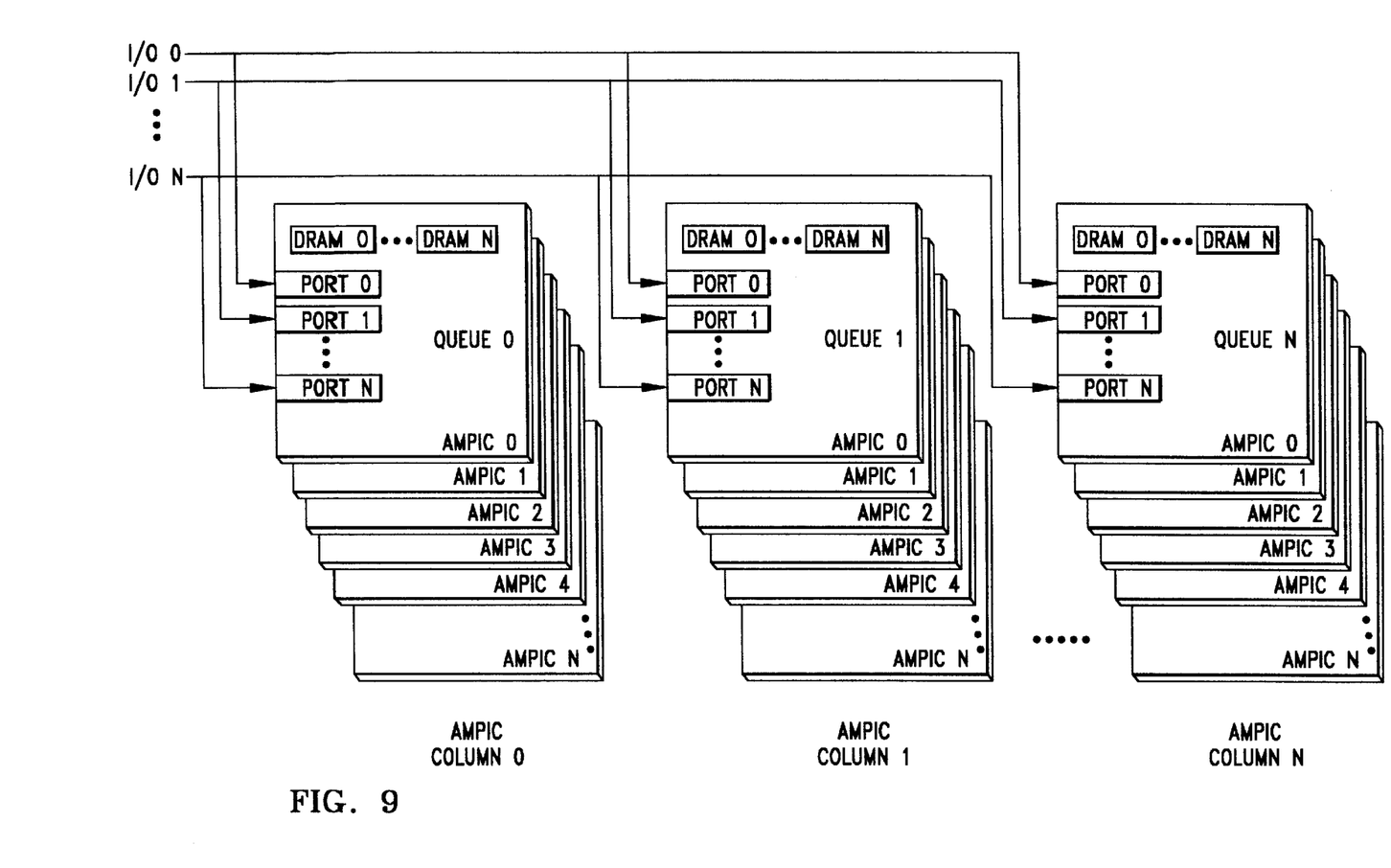
FIG. 9 is a block diagram showing the system in FIGS. 7 and 8 replicated to provide N quality of service and destination architecture queuing.

The invention further provides for queuing for the usual 8 quality of services and data, as shown in FIG. 9.

For such quality of service, columns of the AMPIC DRAM architecture of FIG. 8 may be divided into priority queue 0, priority queue 1, etc. An I/O resource coming in has the choice into which queue to write the buffer data. Out on the I/O module attached to the buffer, the priority and its 4 bit destination are figured, controlled by the switch bar and entering into the appropriate column based on the queue and the corresponding internal AMPIC going into the correct mailbox. For example, I/O module 0 sends to I/O module 16, and its priority 1 would go into this AMPIC and be loaded into this DRAM I/O module 16. The decision as to which column to read out of first, would obviously be based on priority services, and with the DRAMS serving as fifo architecture, again where addresses do not need to be passed around the system, and with the guarantee that there is no contention.

While FIG. 9 illustrates the Quality of Service implemented with columns of AMPICS, where a column represents a priority queue, it should be noted that an alternate embodiment of the invention could implement the queues within an AMPIC with banks of DRAM. An incoming message would be routed to a bank based on its destination header and priority tag. An I/O read port would have dedicated banks of DRAM holding messages sorted and prioritized for that port.

Further modifications will also occur to those skilled in this art, and such are considered to fall within the spirit and the scope of the invention as defined in the appended claims.

What is claimed is:

1. For use in a system having a master controller such as a central processing unit having parallel data ports and a random access memory (DRAM) each connected to a common systems bus interface, an improved DRAM architecture comprising an array of multi-port internally cached DRAM banks (AMPIC DRAM) each comprising a plurality of independent serial data interfaces connected between a separate external I/O data write resource port and the corresponding internal DRAM memory through a corresponding data caching multi-cell slot buffer;

each DRAM bank being connected to a single multi-cell slot buffer and to a single destination I/O data read resource port, each multi-cell slot buffer dedicated to that DRAM bank for respectively storing buffered data destined for that DRAM bank and for reading out the stored data solely to the dedicated I/O data read resource port;

a cross-bar switch interposed between each I/O data write resource port and the corresponding slot buffer, but with all I/O data write resource ports connected to input data to each cross-bar switch, allowing the I/O data write resource port to write to any cell within the multi-cell slot buffer.

2. A system as claimed in claim 1 wherein the cells of each slot buffer are available for storage space for all system I/O resources and are not dedicated to a particular system I/O resource.

3. A system as claimed in claim 1 wherein columns of the arrays are provided, each assigned a queuing priority for different services and data, and with the DRAMs serving to provide a fifo architecture therefor.

4. Apparatus as claimed in claim 1 wherein the data emanates from operation of one of ATM, SONET Cross Connect and WDM.

5. A system as claimed in claim 1 wherein the data provided by each I/O data write resource contains a header destination address corresponding to an I/O data read resource port, and means is provided for routing such data to the slot buffer dedicated to that DRAM bank connected to the I/O data read resource port of that destination address.

6. A system as claimed in claim 5 wherein the use of data-header destination bits and slot buffers dedicated to separate DRAM banks eliminates bus contention and the need for external control paths and random memory addressing, and enables the simultaneous writing of messages into a single slot buffer.

7. A system as claimed in claim 1 wherein each slot buffer is partitioned into a predetermined number of cells, and that number corresponds to the number of system I/O resources.

8. A system as claimed in claim 7 wherein mxn cross bar switch positions are provided, where m is the number of system I/O resources and n is the number of cells per slot buffer; thereby enabling the AMPIC DRAM to steer an incoming data message to any cell within a single slot buffer.

9. A system as claimed in claim 1 wherein all I/O data write resource ports are adapted to write to all DRAM banks, while each I/O data read resource port reads only from the one correspondingly dedicated DRAM bank.

10. A system as claimed in claim 9 wherein the slot buffer size is made of the order of 64 bytes.

11. A system as claimed in claim 10 wherein the data comprises ATM messages and all system I/O resources are enabled simultaneously to write complete ATM messages into a single slot buffer.

12. A system as claimed in claim 11 wherein a 16 DRAM array is provided creating 16 cells of 64 bytes each across the array.

13. In an array of multi-port internally cached DRAM banks (AMPIC DRAM) wherein a plurality of independent serial data interfaces are connected between separate external I/O data write resource ports and the corresponding internal DRAM memory through corresponding data caching multi-cell slot buffers, a method of obviating common system bus interface contention, that comprises, dedicating a single multi-cell slot buffer to each DRAM bank;

dedicating a single destination I/O data read resource port to each DRAM bank;

cross-bar data switching between each I/O data write port and the corresponding multi-cell slot buffer; and connecting all I/O data write resource ports to input data to each of the cross-bar switching, thus allowing any I/O data write resource port to write to any cell within the multi-cell slot buffer.

14. A method as claimed in claim 13 wherein columns of the arrays are provided, each assigned a queuing priority for different services and data, and with the DRAMs serving to provide a FIFO architecture therefor.

15. A method as claimed in claim 13 wherein the data emanates from operation of one of ATM, SONET Cross Connect and WDM.

16. A method as claimed in claim 13 wherein the data provided by each I/O data write resource port contains a header destination address which is used to route such data to the slot buffer dedicated to that DRAM bank that in turn is connected to the I/O data read resource port of that destination address.

17. A method as claimed in claim 16 wherein the use of data-header destination bits and slot buffers dedicated to separate DRAM banks eliminates bus contention and the need for external control paths and random memory addressing, and enables the simultaneous writing of messages into a single slot buffer.

18. A method as claimed in claim 16 wherein each slot buffer is partitioned into a predetermined number of cells, and that number corresponds to the number of system I/O resources.

19. A method as claimed in claim 18 wherein mxn cross bar switchings are provided, where m is the number of system I/O resources and n is the number of cells per slot buffer, enabling the AMPIC DRAM to steer an incoming data message to any cell within a single slot buffer.

20. A method as claimed in claim 19 wherein successive cells are provided for memory storage by all system I/O resources to pack or fill the cells of the slot buffer without unoccupied spaces.

21. A method as claimed in claim 20 wherein all I/O data write resource ports are enabled to write to all DRAM banks, while each I/O data read resource port reads only from the one correspondingly dedicated DRAM bank.

22. A method as claimed in claim 21 wherein the slot buffer size is reduced to the order of 64 bytes.

23. A method as claimed in claim 22 wherein the data comprises ATM messages and all system I/O resources are enabled simultaneously to write complete ATM messages into a single slot buffer.

24. A method as claimed in claim 23 wherein a 16 DRAM array is provided creating 16 cells of 64 bytes each across the array.

25. In an array of multi-port internally cached DRAM banks (AMPIC DRAM) wherein the serial data interfaces of a plurality of independent serial data interfaces are connected between separate external I/O data write resource ports and the corresponding internal DRAM memory through corresponding data caching multi-cell slot buffers, a method of obviating common system bus interface contention while eliminating the need for external control paths and addressing storage, that comprises, dedicating a single multi-cell slot buffer and a single destination I/O data read resource port to each DRAM bank;

and using inherent header destination tags to allow messages to be self-routing through the AMPIC DRAM with all messages with the same tag routed to the same DRAM bank regardless of from which I/O data write resource port the message originated, thereby enabling all system I/O data write resource ports to simultaneously write messages into a single multi-cell slot buffer.

* * * * *